US010119566B2

(12) United States Patent
Ikeda et al.

(10) Patent No.: US 10,119,566 B2
(45) Date of Patent: Nov. 6, 2018

(54) LINEAR ACTUATOR

(71) Applicant: SMC CORPORATION, Chiyoda-ku (JP)

(72) Inventors: Hidefumi Ikeda, Tsukubamirai (JP); Toshio Sato, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/114,174

(22) PCT Filed: Feb. 3, 2014

(86) PCT No.: PCT/JP2014/052400
§ 371 (c)(1),
(2) Date: Jul. 26, 2016

(87) PCT Pub. No.: WO2015/114827
PCT Pub. Date: Aug. 6, 2015

(65) Prior Publication Data
US 2017/0002843 A1    Jan. 5, 2017

(51) Int. Cl.
*F16C 29/06* (2006.01)
*F15B 15/14* (2006.01)

(52) U.S. Cl.
CPC ...... *F16C 29/0602* (2013.01); *F15B 15/1471* (2013.01); *F16C 29/063* (2013.01); *F16C 2220/42* (2013.01)

(58) Field of Classification Search
CPC .... F16C 29/005; F16C 29/06; F16C 29/0602; F16C 29/0609; F16C 29/0611; F16C 29/063; F16C 2220/24

USPC ....................................... 92/DIG. 1
See application file for complete search history.

(56) References Cited

U.S. PATENT DOCUMENTS 8,998,491 B2 *  4/2015  Ishibashi ............. F16C 29/0607
                                                    384/13

FOREIGN PATENT DOCUMENTS

| CN | 2696083 Y | 4/2005 |
| JP | 3795968 B2 | 7/2006 |
| TW | 201139862 A1 | 11/2011 |
| WO | WO000235107 | * 5/2002 |

(Continued)

OTHER PUBLICATIONS

Combined Taiwanese Office Action and Search Report dated Nov. 25, 2016 in patent application No. 103103724 with English summary and English translation of Search Report.

(Continued)

*Primary Examiner* — James Pilkington
(74) *Attorney, Agent, or Firm* — Oblon, McClelland, Maier & Neustadt, L.L.P.

(57) ABSTRACT

A linear actuator. A guide block for constituting a guide mechanism includes a pair of ball circulation grooves formed in the lower surface of the guide block, the lower surface facing a cylinder body, and balls are mounted in the ball circulation groove. A pair of cover blocks are respectively mounted to the opposite end surfaces of the guide block, and the base section of a cover plate of a plate material is mounted to the lower part of the guide block to thereby retain the balls within the ball circulation groove. Hook sections provided to ends of the base section are engaged with the cover blocks to thereby integrally connect the cover blocks and the guide block.

7 Claims, 14 Drawing Sheets

(56) References Cited

FOREIGN PATENT DOCUMENTS

WO     WO2013002064    *   1/2013

OTHER PUBLICATIONS

International Search Report dated Mar. 4, 2014 in PCT/JP2014/052400 filed Feb. 3, 2014.
Combined Chinese Office Action and Search Report dated Feb. 1, 2018 in Chinese Patent Application No. 201480074750.1 (with English translation) 15 pages.

* cited by examiner

LINEAR ACTUATOR

TECHNICAL FIELD

The present invention relates to a linear actuator in which a slide table is made to move reciprocally in axial directions of a cylinder main body.

BACKGROUND ART

Heretofore, a linear actuator, for example, which is made up of a fluid pressure cylinder or the like, has been used as a means for transporting workpieces under the supply of a pressure fluid. As disclosed in Japanese Patent No. 3795968, the present applicants have proposed a linear actuator, which is capable of transporting a workpiece that is mounted on a slide table by causing the slide table to move reciprocally in a straight line along a cylinder main body. However, with the aforementioned linear actuator, in recent years, there has been a demand to reduce manufacturing costs and to enhance ease of assembly by simplifying the structure of the linear actuator.

SUMMARY OF INVENTION

A general object of the present invention is to provide a linear actuator, which can be manufactured at a lower cost, together with enhancing ease of assembly by simplifying the structure of the linear actuator.

The present invention is characterized by a linear actuator in which a slide table is made to move reciprocally along an axial direction of a cylinder main body, the linear actuator including:

a guide mechanism including a guide block attached to the cylinder main body, the guide block including circulation grooves formed therein, wherein a plurality of rolling bodies roll and circulate through the circulation grooves, and cover members disposed on ends of the guide block, the guide mechanism being configured to guide the slide table along an axial direction of the cylinder main body;

a retaining member mounted on the guide block, and configured to retain the rolling bodies so as to be freely circulatable in the circulation grooves and retain the cover members with respect to the guide block;

wherein the retaining member is disposed detachably with respect to the guide block.

According to the present invention, in the guide mechanism that makes up the linear actuator, the guide block contains therein the circulation grooves through which the rolling bodies roll and circulate, the cover members are disposed on ends of the guide block, and the retaining member is disposed detachably with respect to the guide block. Owing thereto, the rolling bodies are retained so as to be freely circulatable in the circulation grooves, while the cover members are retained with respect to the guide block.

Consequently, for example, compared to a case in which the cover members are assembled by bolts or the like with respect to the guide block, using the retaining member, the cover members can be assembled more easily with respect to the guide block. In addition, simply by attachment of the retaining member, the circulation grooves can be covered reliably and the rolling bodies can be held in the circulation grooves. Thus, ease of assembly can be enhanced, and by simplifying the structure thereof, manufacturing can be performed at a low cost.

DESCRIPTION OF EMBODIMENTS

Figure 1:
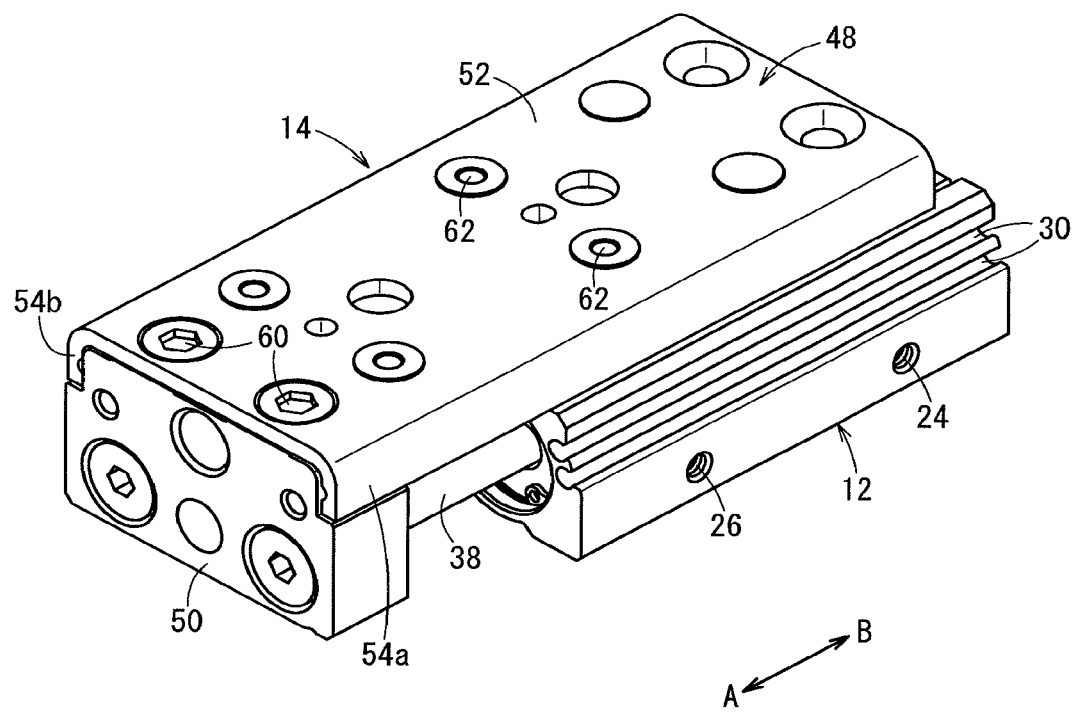
FIG. 1 is an exterior perspective view of a linear actuator according to an embodiment of the present invention.
Figure 2:
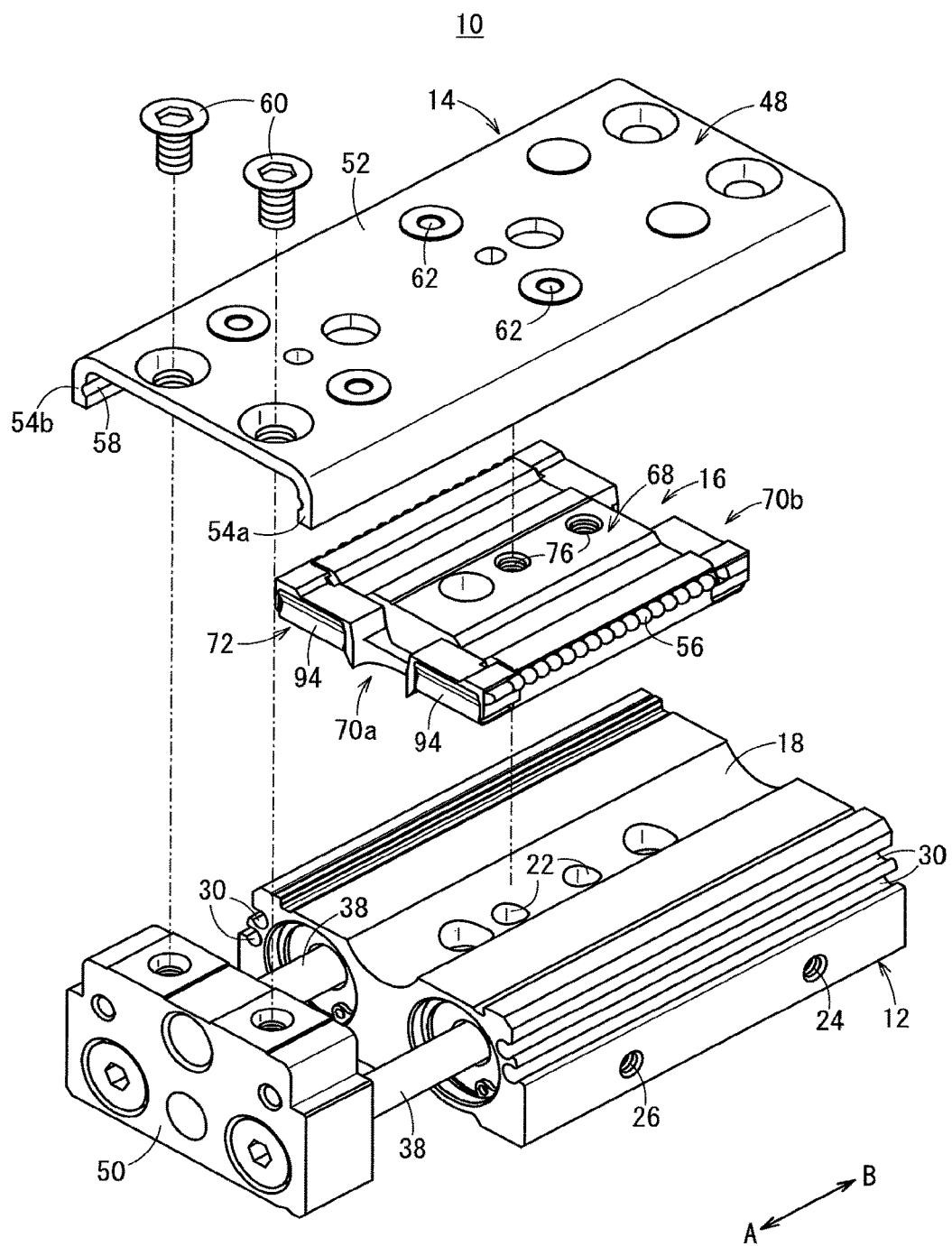
FIG. 2 is an exploded perspective view of the linear actuator shown in FIG. 1.

As shown in FIGS. 1 through 6, a linear actuator 10 according to the present invention comprises a cylinder main body 12, a slide table 14 disposed on an upper portion of the cylinder main body 12 and which makes reciprocal motion in a straight line along a longitudinal direction (the directions of arrows A and B), and a guide mechanism 16 disposed to intervene between the cylinder main body 12 and the slide table 14, for guiding the slide table 14 in the longitudinal direction (the directions of arrows A and B).

The cylinder main body 12 is formed, for example, from a metal material such as an aluminum alloy or the like, and is formed with a predetermined length in the longitudinal direction (the directions of arrows A and B) with a rectangular shape in cross section. A recessed part 18, which is recessed with a substantially semicircular shape in cross section, is formed roughly in the center on an upper surface of the cylinder main body 12 (see FIG. 2). The recessed part 18 extends in the longitudinal direction (the directions of arrows A and B), and a pair of insertion holes 22 penetrate therethrough, through which connecting bolts 20 are inserted for connecting the cylinder main body 12 with the guide mechanism 16.

Further, on one side surface of the cylinder main body 12, first and second ports 24, 26 for supply and discharge of a pressure fluid are formed perpendicularly to the longitudinal direction (the directions of arrows A and B) of the cylinder main body 12. The first and second ports 24, 26 communicate with a pair of penetrating holes 28a, 28b to be described later (see FIG. 4). Furthermore, on opposite side surfaces of the cylinder main body 12, sensor attachment grooves 30 are formed, respectively, along the longitudinal direction (the directions of arrows A and B), which have non-illustrated sensors mounted therein.

Figure 3:
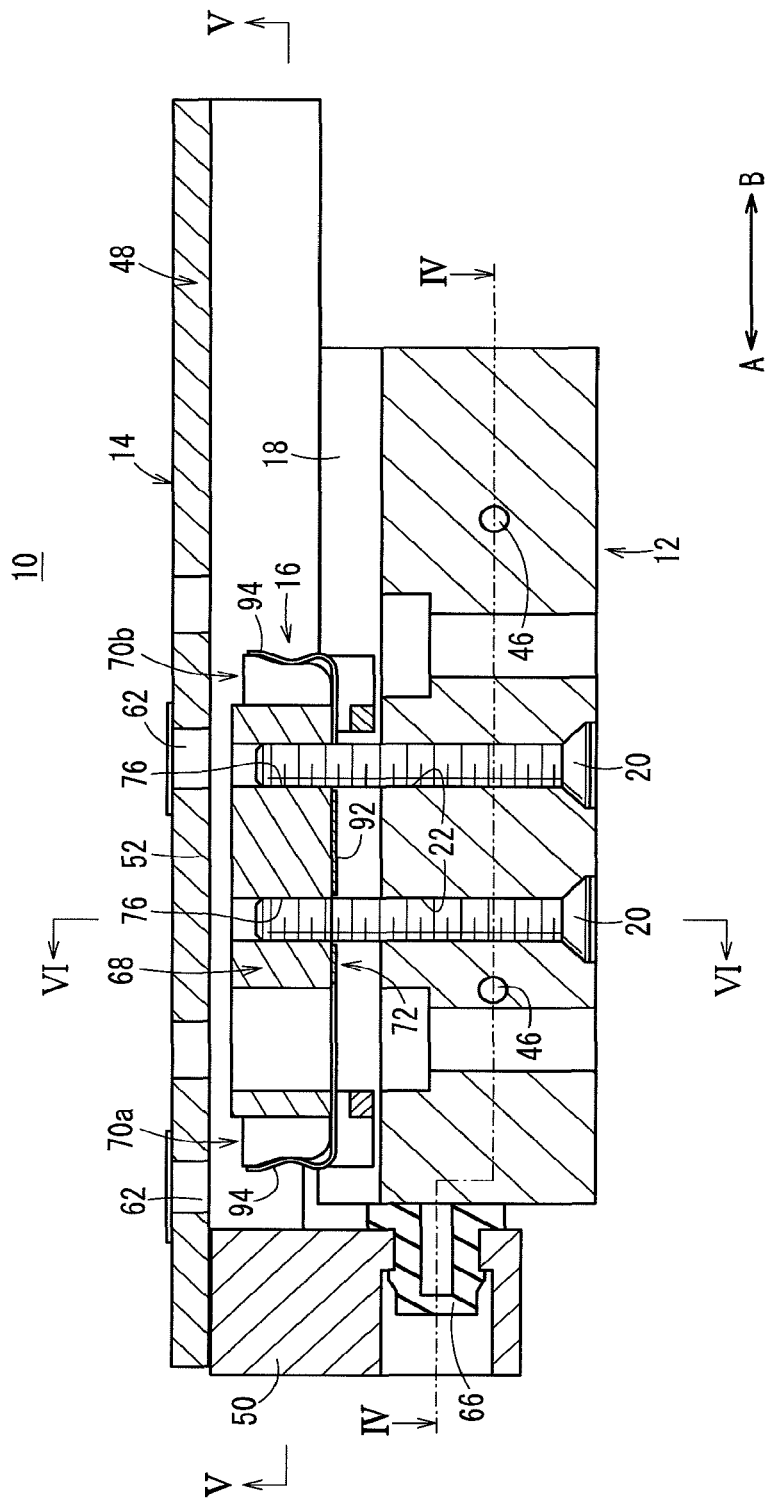
FIG. 3 is an overall vertical cross-sectional view of the linear actuator of FIG. 1.

On a lower surface of the cylinder main body 12, a pair of insertion holes 22 are formed centrally in the widthwise direction on an axial line. As shown in FIG. 3, the connecting bolts 20 are inserted through the insertion holes 22 from below. Additionally, distal ends of the connecting bolts 20 project from the upper surface of the cylinder main body 12, and are connected mutually by threaded engagement with a guide block 68 of the guide mechanism 16.

Figure 4:
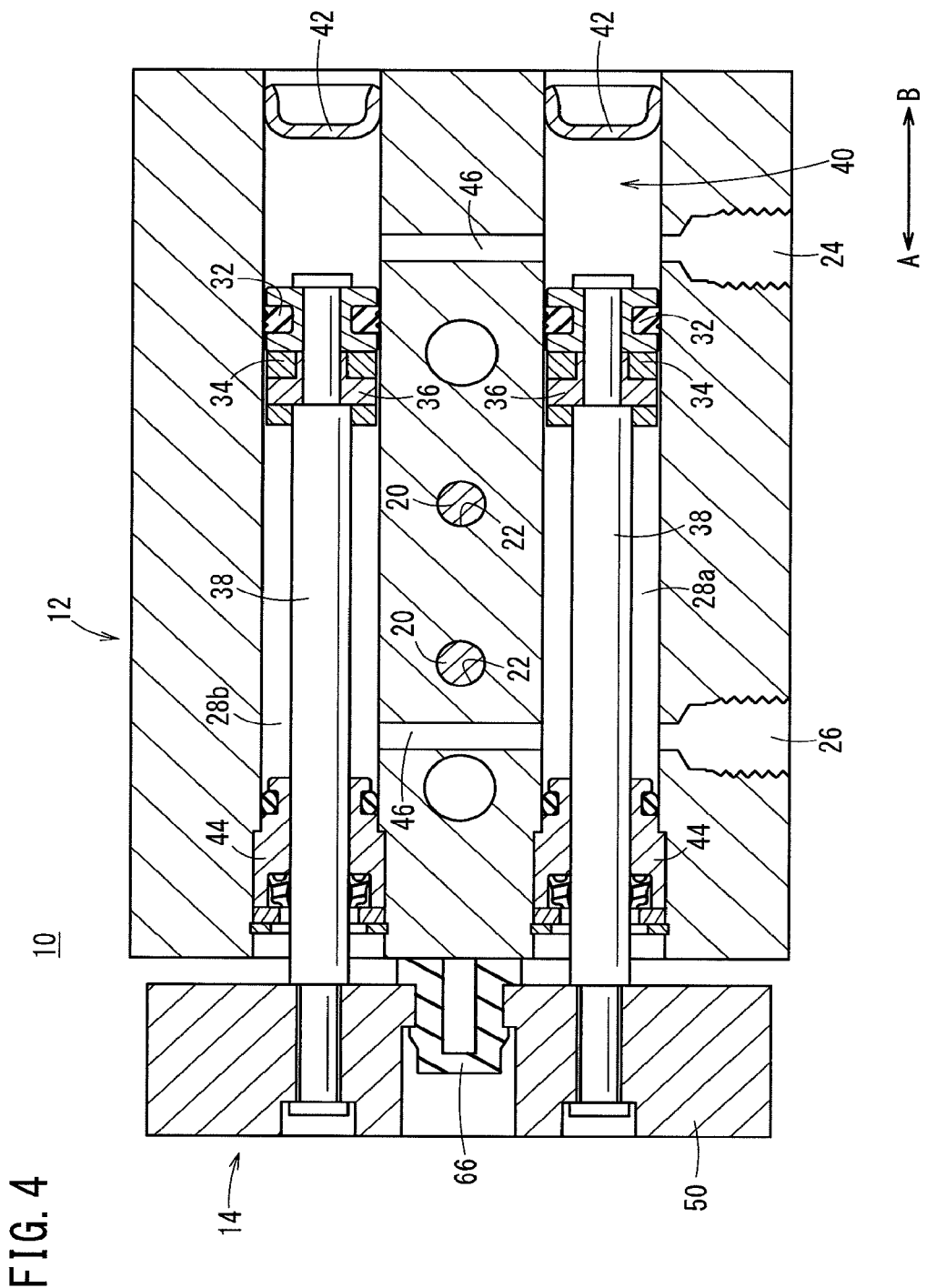
FIG. 4 is a cross-sectional view taken along line IV-IV of FIG. 3.

On the other hand, as shown in FIG. 4, inside the cylinder main body 12, the pair of penetrating holes 28a, 28b are formed, which penetrate along the longitudinal direction (the directions of arrows A and B), the one penetrating hole 28a and the other penetrating hole 28b being disposed substantially in parallel alongside one another and separated by a predetermined distance.

Inside the penetrating holes 28a, 28b, cylinder mechanisms 40 are provided, respectively, each including a piston 36 with a sealing ring 32 and a magnet 34 being installed in the outer circumferential surface thereof, and a piston rod 38 connected to the piston 36. The cylinder mechanisms 40 are constituted by installation of the pair of pistons 36 and the piston rods 38, respectively, into the pair of penetrating holes 28a, 28b.

Further, the penetrating holes 28a, 28b are closed and sealed at one end thereof by caps 42, whereas other ends of the penetrating holes 28a, 28b are sealed hermetically by rod holders 44, which are retained via locking rings.

Furthermore, one of the penetrating holes 28a communicates respectively with the first and second ports 24, 26, whereas the other penetrating hole 28b also communicates mutually with the one penetrating hole 28a via a pair of connecting passages 46 formed between the one penetrating hole 28a and the other penetrating hole 28b. More specifically, the pressure fluid is supplied to the first and second ports 24, 26 and introduced into the one penetrating hole 28a, and then the pressure fluid is introduced into the other penetrating hole 28b through the connecting passages 46. The connecting passages 46 are formed perpendicularly to the direction of extension (the directions of arrows A and B) of the penetrating holes 28a, 28b.

As shown in FIGS. 1 through 6, the slide table 14 comprises a table main body 48, and an end plate 50 connected to another end of the table main body 48. The end plate 50 is connected perpendicularly with respect to the table main body 48.

The table main body 48 is made up from a base member 52 that extends along the longitudinal direction (the directions of arrows A and B) with a predetermined thickness, and a pair of guide walls 54a, 54b that extend downward perpendicularly from both sides of the base member 52. On inner surfaces of the guide walls 54a, 54b, first ball guide grooves 58 are formed for guiding balls (rolling bodies) 56 of the guide mechanism 16, to be described later. The first ball guide grooves 58 are recessed with substantially semicircular shapes in cross section.

Further, on an end of the table main body 48, the end plate 50 is fixed thereto by another pair of bolts 60.

Four workpiece retaining holes 62 are formed in the base member 52, which are separated mutually by predetermined distances, for example. The workpiece retaining holes 62 are used for fixing a workpiece (not shown), for example, which is mounted on the slide table 14.

The end plate 50 is fixed to the other end of the table main body 48, and is disposed to face toward an end surface of the cylinder main body 12. The end plate 50 also is fixed to respective ends of the piston rods 38, which are inserted through a pair of rod holes formed in the end plate 50. Owing thereto, the slide table 14 including the end plate 50 is displaceable together with the piston rods 38 along the longitudinal direction (the directions of arrows A and B) of the cylinder main body 12.

Further, a damper 66 is mounted through a damper installation hole substantially in the center of the end plate 50. The damper 66 is made from an elastic material such as rubber or the like, and is mounted such that an end portion thereof projects outwardly from the end surface of the end plate 50, so that upon displacement of the slide table 14, the damper 66 comes into abutment against an end surface of the cylinder main body 12.

As shown in FIGS. 2 and 5 through 10, the guide mechanism 16 includes the wide flat guide block 68, a pair of cover blocks (cover members) 70a, 70b disposed on opposite ends of the guide block 68, plural balls 56 that circulate along the longitudinal direction of the guide block 68, and a cover plate (retaining member) 72 that retains the balls 56 in ball circulation grooves (circulation grooves) 71 of the guide block 68.

The guide block 68, is formed, for example, from a metal material such as stainless or carbon steel, and is formed with second ball guide grooves 74 on opposite side surfaces thereof along the longitudinal direction (the directions of arrows A and B), and with the pair of ball circulation grooves 71, in which the balls 56 are installed, formed on a bottom surface thereof along the longitudinal direction (the directions of arrows A and B). More specifically, the second ball guide grooves 74 and the ball circulation grooves 71 are formed substantially in parallel with each other (see FIG. 10). The second ball guide grooves 74 are formed with semicircular shapes in cross section in the same manner as the first ball guide grooves 58.

Additionally, when the slide table 14 is arranged on an upper part of the guide mechanism 16, the second ball guide grooves 74 are formed at positions that are face-to-face with the first ball guide grooves 58, and the ball circulation grooves 71 are formed so as to face toward the upper surface of the cylinder main body 12.

Further, centrally in the widthwise direction of the guide block 68, a pair of bolt holes 76 are formed in which the connecting bolts 20 are screw-engaged.

The cover blocks 70a, 70b, for example, are made from a resin material such as nylon or the like, each of which includes a main body portion 78, and a cutout portion 80, which is cutout substantially centrally in the widthwise direction of the main body portion 78.

The main body portion 78 is formed in a divided manner in left and right widthwise directions about the cutout portion 80, with one end surface thereof that abuts against the guide block 68 being formed in a planar shape, and the other end surface thereof opposite from the one end surface being formed in a stepped shape.

Further, substantially in the center in the widthwise direction of the main body portion 78, an arcuate section 82 is formed, which projects downwardly with an arcuate shape in cross section. The arcuate section 82 is inserted into the recessed part 18 when the guide mechanism 16 is connected to the upper part of the cylinder main body 12.

Furthermore, when the main body portions 78 are placed in abutment against end surfaces of the guide block 68, the ends of the ball circulation grooves 71 are closed, and since the cutout portions 80 thereof penetrate from the one end surface to the other end surface of the cover blocks 70a, 70b, the end surfaces of the guide block 68 are exposed through the cutout portions 80.

Further, on one end surface of the main body portion 78, a pair of return guides 84, which serve to reverse the direction in which the balls 56 are circulated, is disposed respectively via installation holes 86. The return guides 84 are equipped with groove-shaped guide portions 88 formed with semicircular shapes in cross section, through which the balls 56 roll along an outer circumferential surface thereof. In addition, when the cover blocks 70a, 70b, in which the return guides 84 are installed, are mounted on opposite end surfaces of the guide block 68, one of the ends of each of the return guides 84 is connected to the associated ball circulation groove 71, whereas another end thereof is connected to the associated second ball guide groove 74.

More specifically, the ball circulation grooves 71 and the second ball guide grooves 74 are connected by the return guides 84, such that, in the return guides 84, the balls 56 roll continuously while the direction of movement thereof is converted 180° from the ball circulation grooves 71 to the first and second ball guide grooves 58, 74 via the guide portions 88.

On the other hand, on the other side surface of the main body portion 78, a pair of retaining sections (engagement sections) 90, which are separated mutually by a predetermined distance, are formed about the cutout portion 80. The retaining sections 90 are formed by being recessed at a predetermined depth toward the one end surface side of the main body portion 78. Hook portions 94 of the cover plate 72, to be described later, are engaged respectively in the retaining sections 90.

As shown in FIGS. 7 through 14, the cover plate 72, for example, is formed by press-molding a plate material made from a metal material such as stainless steel or the like, and is constituted from a base portion (rolling body retaining section) 92, and four hook portions (cover retaining sections) 94, which are erected perpendicularly on opposite ends of the base portion 92 along the longitudinal direction (the directions of arrows A and B) of the base portion 92.

Figure 11:
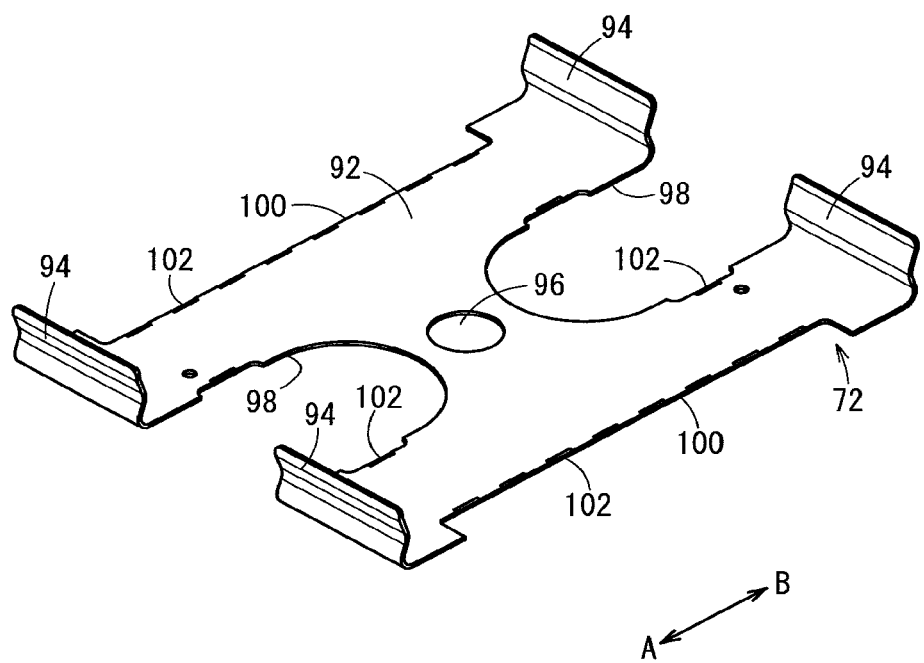
FIG. 11 is an exterior perspective view of a cover plate that constitutes part of the guide mechanism of FIG. 7.
Figure 12:
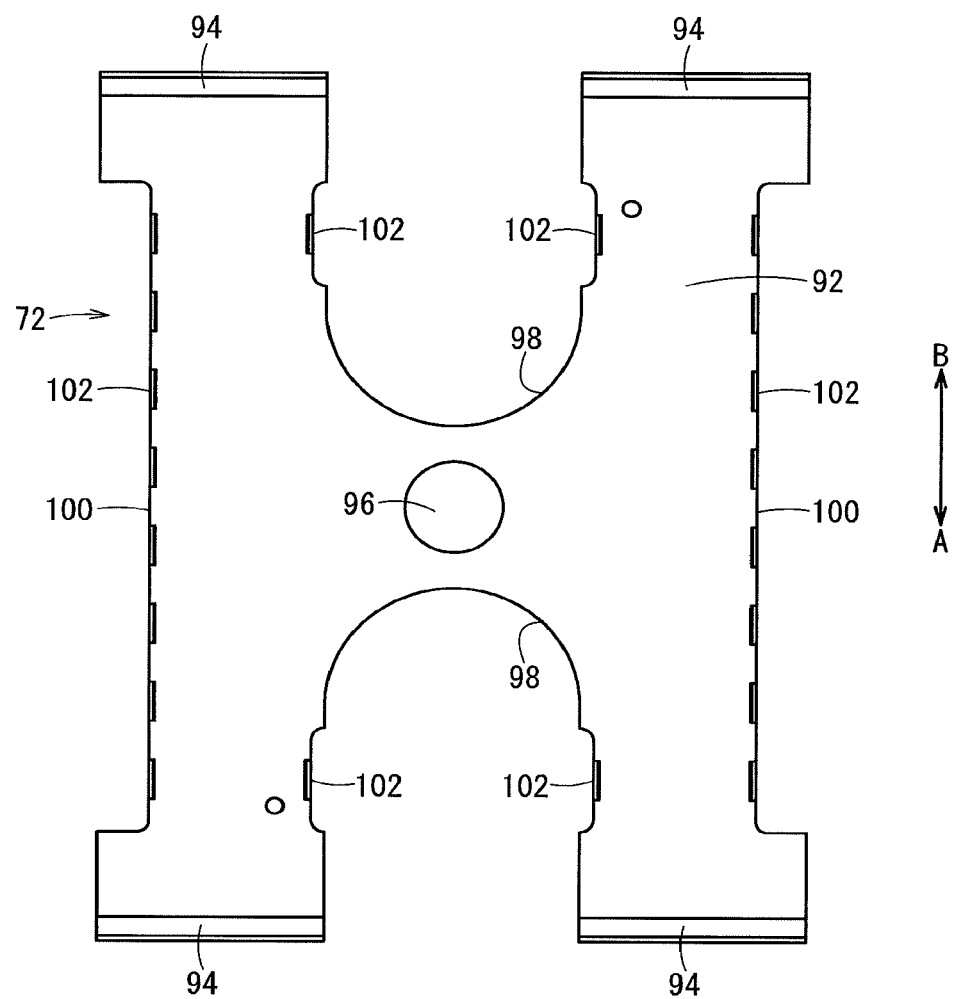
FIG. 12 is a plan view of the cover plate shown in FIG. 11.

As shown in FIGS. 11 and 12, the base portion 92, for example, is formed in a substantially planar shape having a hole 96 substantially in the center thereof through which a connecting bolt 20 is inserted, and a pair of recess portions 98 that are cut out in semi-oval shapes, are formed respectively, on opposite end sides of the hole 96. Further, on opposite sides of the base portion 92 in the widthwise direction of the base portion 92, a pair of recessed parts 100, which are recessed inward toward the center in the widthwise direction with substantially rectangular shapes, are formed.

Figure 13:
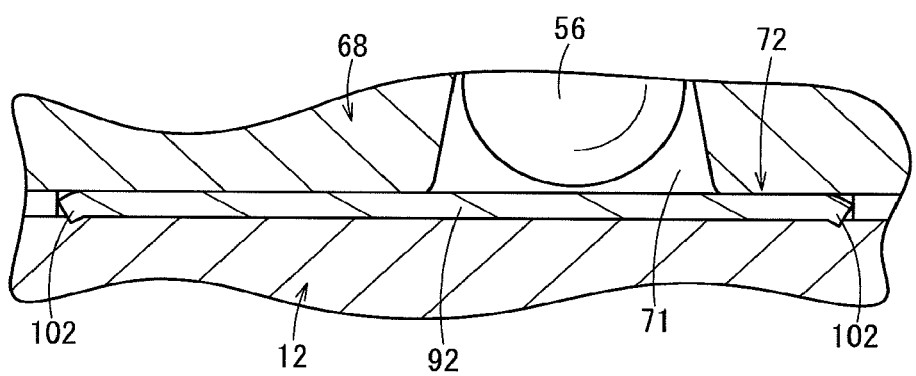
FIG. 13 is an enlarged cross-sectional view showing the vicinity of projecting parts of the cover plate shown in FIG. 6.

Plural projecting parts 102 which project out by being bent at a predetermined angle with respect to the base portion 92, are formed on edge parts of the recess portions 98 and the recessed parts 100. As shown in FIG. 13, the projecting parts 102 are formed so as to project in an opposite direction to the direction in which the hook portions 94 project with respect to the base portion 92, and for example, are bent with respect to the base portion 92 at an angle of inclination of roughly 30° to 45°. Further, the projecting parts 102 are formed each with a predetermined length along the longitudinal direction (the direction of arrows A and B) of the base portion 92, and are separated mutually at equal intervals.

Stated otherwise, when the guide block 68 is assembled with the cylinder main body 12 and the slide table 14, the projecting parts 102 are formed so as to project toward the cylinder main body 12.

The hook portions 94 are formed, for example, with predetermined widths along the widthwise direction of the base portion 92, and are formed in a pair on each of one end and the other end of the base portion 92. The hook portions 94 are formed so as to project at a predetermined height with respect to the base portion 92. Further, as shown in FIG. 14, substantially in the center in the heightwise direction thereof, the hook portions 94 are bent with a substantially V-shape in cross section, which is convex toward the center of the base portion 92.

Figure 14:
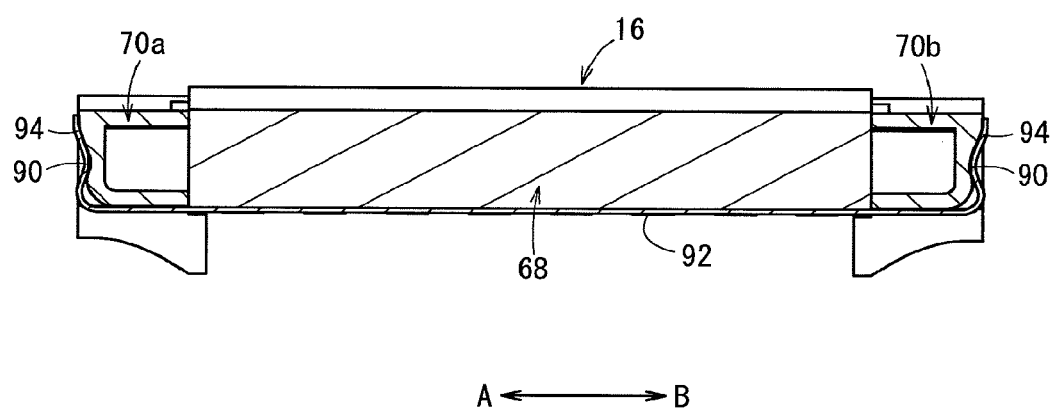
FIG. 14 is a cross-sectional view taken along line XIV-XIV of FIG. 7

Moreover, as shown in FIG. 14, the interval distance between the hook portions 94 that are formed on one end side of the base portion 92, and the hook portions 94 that are formed on the other end side of the base portion 92 is substantially equal to or slightly smaller than the length of the guide block 68 and the pair of cover blocks 70a, 70b in the longitudinal direction.

Figure 6:
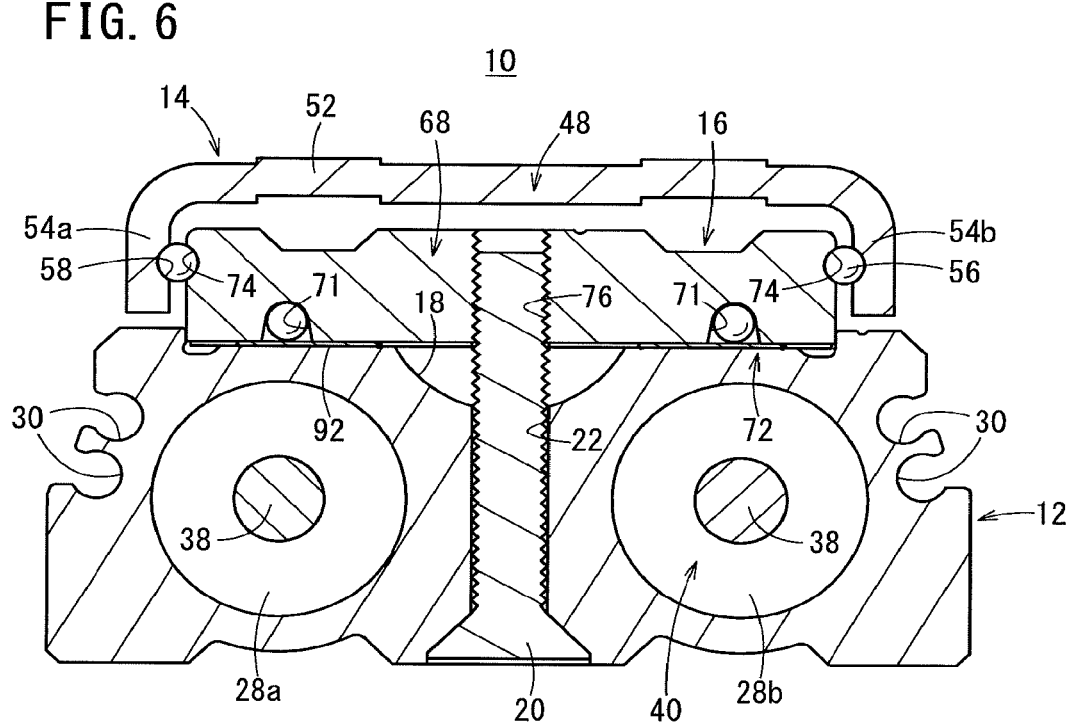
FIG. 6 is a cross-sectional view taken along line VI-VI of FIG. 3.
Figure 7:
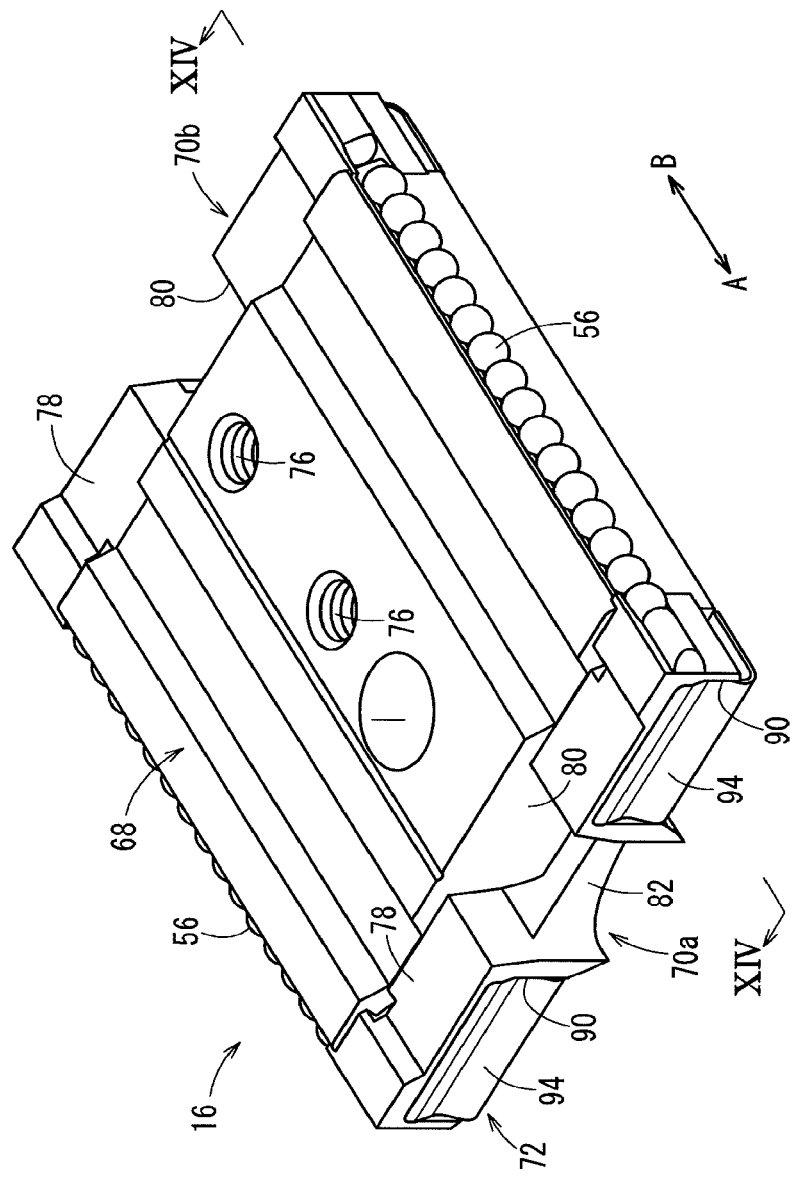
FIG. 7 is an exterior perspective view of a guide mechanism that constitutes part of the linear actuator of FIG. 1.
Figure 9:
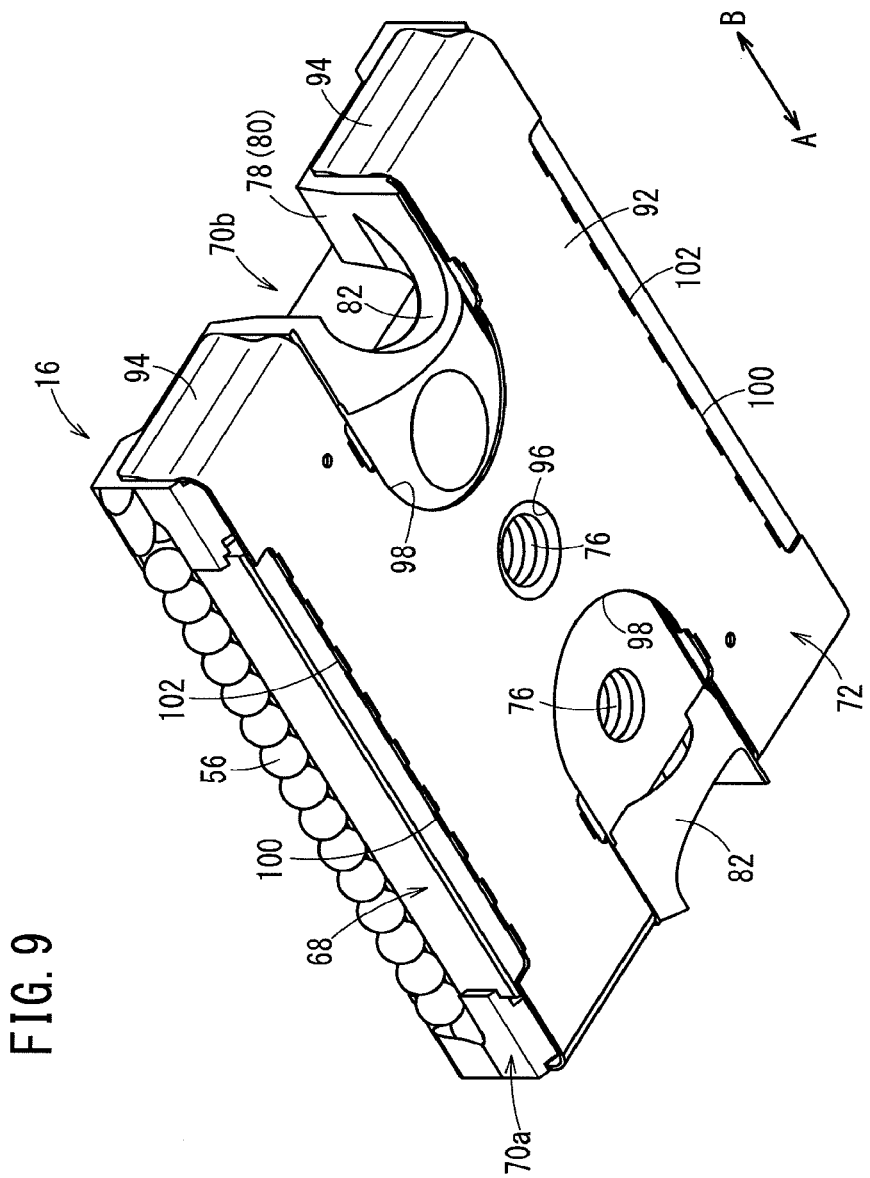
FIG. 9 is an exterior perspective view of the guide mechanism of FIG. 7 as observed from another direction.

In addition, as shown in FIGS. 6 and 9, since the pair of ball circulation grooves 71 are covered by the base portion 92 of the cover plate 72 abutting against the lower surface of the guide block 68, the balls 56 are retained inside the ball circulation grooves 71, and the balls 56 are retained in the ball circulation grooves 71 in a state in which dropping out of the balls 56 in a direction away from the ball circulation grooves 71 is prevented. Further, as shown in FIGS. 7, 9 and 14, in a state in which the pair of cover blocks 70a, 70b are disposed respectively on both end surfaces of the guide block 68, the four hook portions 94 of the cover plate 72 are placed in engagement respectively with the retaining sections 90 of the cover blocks 70a, 70b, whereby the guide mechanism 16 is configured to be retained by the cover plate 72 in a state with the guide block 68 sandwiched between the pair of cover blocks 70a, 70b. Stated otherwise, the cover plate 72 is retained with respect to the cover blocks 70a, 70b.

More specifically, the cover plate 72 is equipped in a dual manner with a ball retaining function for retaining the plural balls 56 with respect to the guide block 68, and a cover retaining function for retaining the pair of cover blocks 70a, 70b with respect to both ends of the guide block 68.

The linear actuator 10 according to the embodiment of the present invention is basically constructed as described above. Next, an explanation will be given concerning assembly of the guide mechanism 16 of the linear actuator 10.

Figure 8:
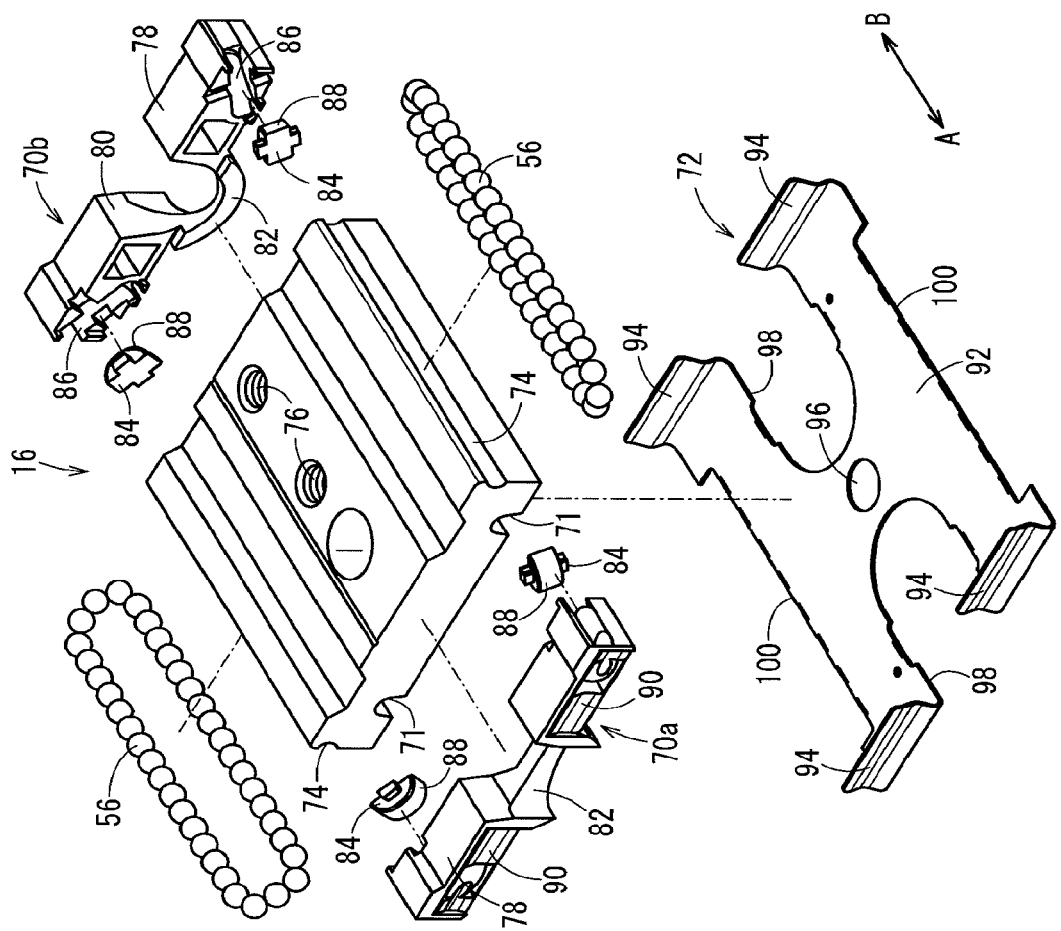
FIG. 8 is an exploded perspective view of the guide mechanism shown in FIG. 7.
Figure 10:
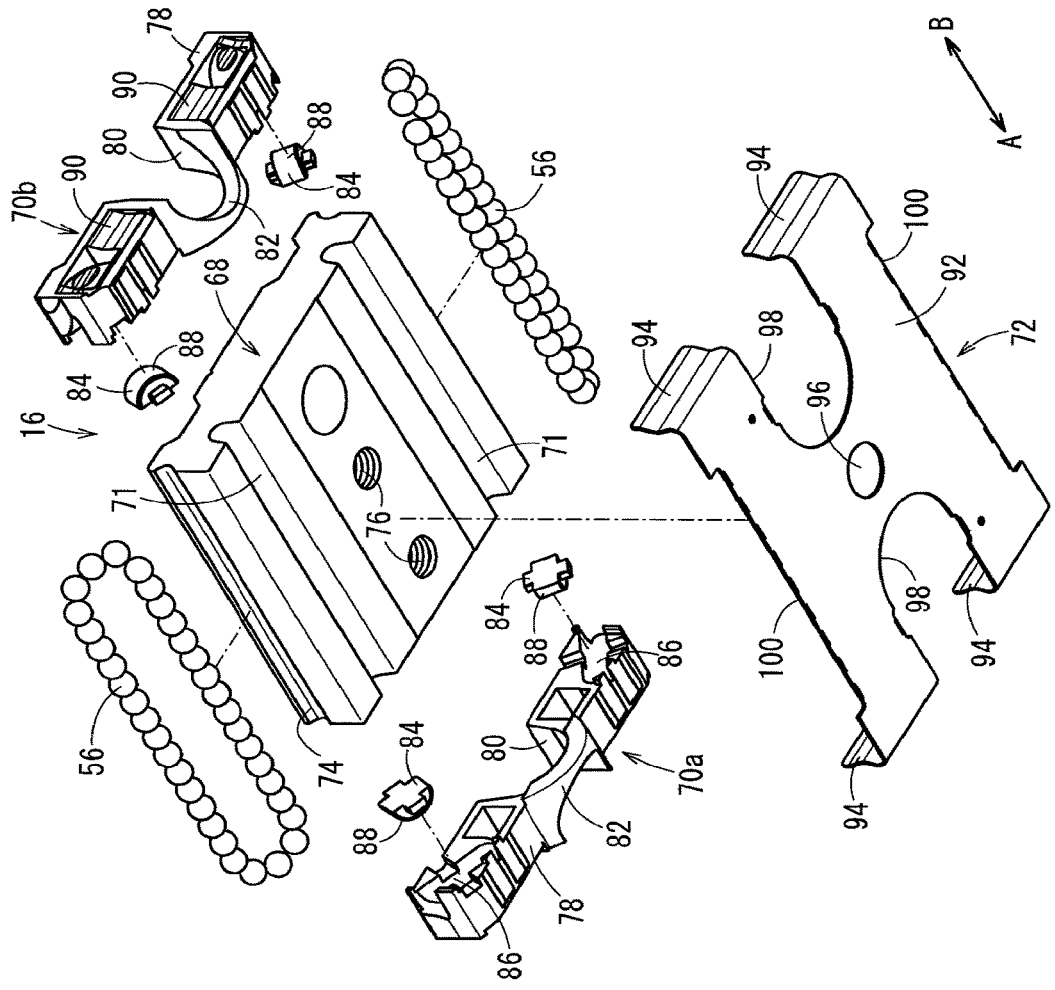
FIG. 10 is an exploded perspective view of the guide mechanism shown in FIG. 9.

At first, from the state shown in FIGS. 8 and 10, after the plural balls 56 have been installed in the second ball guide grooves 74 and the ball circulation grooves 71 of the guide block 68, the cover blocks 70a, 70b are placed in abutment, respectively, against both end surfaces of the guide block 68. In this case, the balls 56 installed in the second ball guide grooves 74 are retained by a non-illustrated jig or the like to prevent dropping out thereof from the guide block 68.

Next, the cover plate 72 is brought into proximity from the lower surface side of the guide block 68, and the base portion 92 thereof is placed in abutment against the lower surface, thereby covering the pair of ball circulation grooves 71. As a result, the plural balls 56 in the ball circulation grooves 71 are retained by the base portion 92, so that the balls 56 cannot drop out from the open ball circulation grooves 71.

In addition, by engagement of the hook portions 94 of the cover plate 72, respectively, with respect to the retaining sections 90 of the cover blocks 70a, 70b, the cover blocks 70a, 70b are fixed in a state of abutment against both ends of the guide block 68, and the cover plate 72 is placed in a retained state with respect to the guide block 68 and the cover blocks 70a, 70b, whereupon assembly of the guide mechanism 16 is completed.

In a condition in which the guide mechanism 16, which is assembled in the foregoing manner, is mounted on an upper part of the cylinder main body 12, the connecting bolts 20 are inserted through the insertion holes 22 of the cylinder main body 12, and screw-engaged in the bolt holes 76 of the guide block 68, whereby the cylinder main body 12 and the guide mechanism 16 are fixed together by being pulled mutually in directions to approach one another. At this time, the base portion 92 of the cover plate 72 abuts against the upper surface of the cylinder main body 12, while in addition, they are formed by a material which is harder than the cylinder main body 12. Thus, upon screw-engagement of the connecting bolts 20, the plural projecting parts 102 enter the cylinder main body 12 by biting into the cylinder main body 12.

As a result, by fixing the guide mechanism 16 with respect to the cylinder main body 12, simultaneously with performing positioning in accordance with the plural projecting parts 102 biting into the cylinder main body 12, slippage or backlash, etc., can suitably be prevented.

In the foregoing manner, with the guide mechanism 16 of the linear actuator 10, using a single cover plate 72 and by attaching the cover plate 72 to the guide block 68, the plural balls 56 can be retained so as to be freely circulatable in the ball circulation grooves 71 of the guide block 68, and the pair of cover blocks 70a, 70b, which are placed in abutment against both ends of the guide block 68, can be fixed easily.

As a result, for example, compared to a case of being assembled mutually using bolts or the like, the guide mechanism 16 including the guide block 68 and the cover blocks 70a, 70b, etc., can be assembled more easily, and the structure thereof can be simplified. Therefore, in the linear actuator 10 that includes the guide mechanism 16, ease of assembly can be enhanced and manufacturing costs can be reduced.

Further, when the guide mechanism 16 is fixed to the upper part of the cylinder main body 12, under screw-engagement action of the connecting bolts 20, by pulling the cylinder main body 12 and the guide mechanism 16 in directions to mutually approach one another, the plural projecting parts 102, which are formed on the cover plate 72, can be made to bite into the cylinder main body 12, whereby mutually positioning between such members can be carried out, and slippage or backlash, etc., of the guide mechanism 16 with respect to the cylinder main body 12 can be prevented.

Furthermore, in the guide block 68, instead of providing penetrating holes through which the balls 56 circulate, a configuration is provided in which ball circulation grooves 71 that open downwardly are formed and the balls 56 are made to circulate through the ball circulation grooves 71. Owing thereto, compared to the case of forming penetrating holes therein, the number of process steps as well as processing costs can be reduced. As a result, manufacturing costs for the linear actuator 10 can be reduced.

Figure 5:
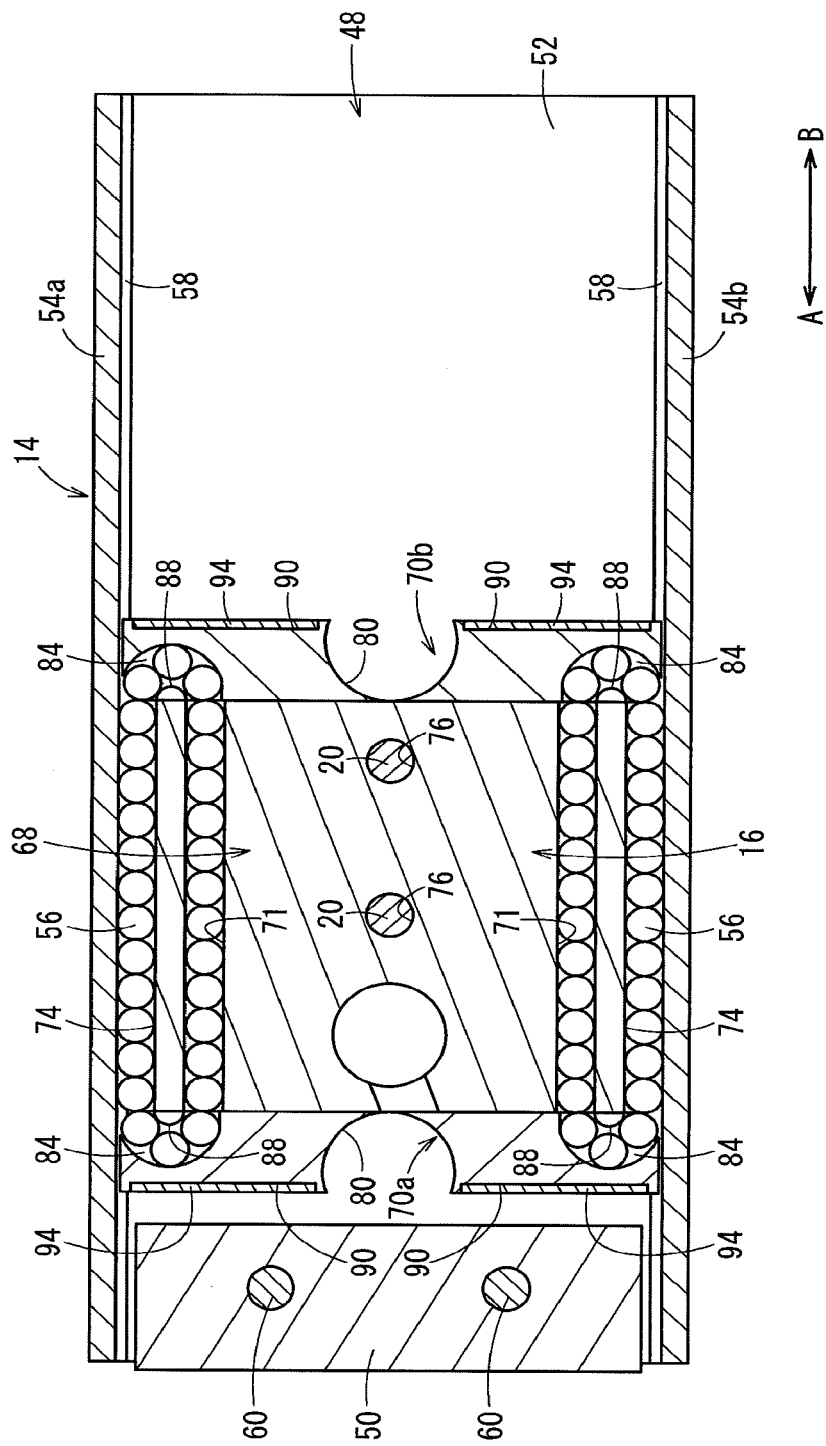
FIG. 5 is a cross-sectional view taken along line V-V of FIG. 3.

Next, operations and effects of the linear actuator 10, which includes the guide mechanism 16 that is assembled in the foregoing manner, will be explained. A condition in which the end plate 50 of the slide table 14 abuts against the end surface of the cylinder main body 12, as shown in FIGS. 4 and 5, will be referred to as an initial position.

First, a pressure fluid from a non-illustrated pressure fluid supply source is introduced to the first port 24. In this case, the second port 26 is placed in a condition of being open to atmosphere under the operation of a non-illustrated switching valve.

Pressure fluid supplied to the first port 24 is supplied to one of the penetrating holes 28a and also is supplied to the other penetrating hole 28b through the connecting passages 46, whereby the pistons 36 are pressed (in the direction of the arrow A) toward the rod holders 44. Consequently, the slide table 14 is displaced together with the piston rods 38, which are connected to the pistons 36, in a direction to separate away from the cylinder main body 12.

At this time, accompanying displacement of the slide table 14, the balls 56 of the guide mechanism 16 roll along the ball circulation grooves 71 as well as the first and second ball guide grooves 58, 74, whereby the slide table 14 is guided along the axial direction by the guide mechanism 16.

On the other hand, in the case that the slide table 14 is displaced in an opposite direction of the above-mentioned direction, the pressure fluid, which was supplied to the first port 24, is supplied with respect to the second port 26, and the first port 24 is placed in a state of being open to atmosphere. As a result, by means of the pressure fluid, which is supplied into the pair of penetrating holes 28a, 28b from the second port 26, the pistons 36 are displaced in a direction away from the rod holders 44 (in the direction of the arrow B), and the slide table 14 is displaced through the pistons 36 together with the piston rods 38 in a direction to approach the cylinder main body 12. In addition, by abutment of the damper 66, which is disposed on the end plate 50 of the slide table 14, against the end surface of the cylinder main body 12, the initial position is restored.

The linear actuator according to the present invention is not limited to the embodiment described above. Various alternative or additional features and structures may be adopted therein without deviating from the essence and scope of the invention as set forth in the appended claims.

The invention claimed is:

1. A linear actuator in which a slide table is made to move reciprocally along an axial direction of a cylinder main body, comprising:
    a guide mechanism comprising a guide block attached to the cylinder main body, the guide block including circulation grooves formed therein, wherein a plurality of rolling bodies roll and circulate through the circulation grooves, and cover members disposed on ends of the guide block, the guide mechanism being configured to guide the slide table along an axial direction of the cylinder main body;
    a retaining member mounted on the guide block and configured to retain the rolling bodies so as to be freely circulatable in the circulation grooves, and retain the cover members with respect to the guide block, the retaining member including a rolling body retaining section extending along the circulation grooves and configured to retain the rolling bodies, and cover retaining sections which are bent with respect to the rolling body retaining section to extend from the rolling body retaining section in a direction different from the direction of extension of the rolling body retaining section,
    wherein the retaining member is disposed detachably with respect to the guide block, and
    wherein the cover retaining sections extend along an outer side surface of the cover members and have mating portions that engage with mating portions at the outer side surface of the cover members to retain the cover members, wherein the mating portions of the cover retaining sections and the mating portions of the cover members are each elongated in a direction parallel to the outer side surface of a respective cover member and transverse to the extending direction of the cover retaining sections from the rolling body retaining section.

2. The linear actuator according to claim 1, wherein the retaining member is formed by press-molding a plate material.

3. The linear actuator according to claim 1, wherein the circulation grooves open toward the cylinder main body.

4. A linear actuator in which a slide table is made to move reciprocally along an axial direction of a cylinder main body, comprising:

a guide mechanism comprising a guide block attached to the cylinder main body, the guide block including circulation grooves formed therein, wherein a plurality of rolling bodies roll and circulate through the circulation grooves, and cover members disposed on ends of the guide block, the guide mechanism being configured to guide the slide table along an axial direction of the cylinder main body;

a retaining member mounted on the guide block and configured to retain the rolling bodies so as to be freely circulatable in the circulation grooves, and retain the cover members with respect to the guide block, the retaining member including a rolling body retaining section extending along the circulation grooves and configured to retain the rolling bodies, and cover retaining sections which are bent with respect to the rolling body retaining section, wherein the retaining member is disposed detachably with respect to the guide block, and wherein the cover retaining sections extend along an outer side surface of the cover members and are disposed in abutment with the outer side surface of the cover members to retain the cover members, wherein the rolling body retaining section is disposed in abutment against an end surface of the guide block that faces toward the cylinder main body, and is equipped with a projecting part that projects toward the cylinder main body.

5. The linear actuator according to claim 4, wherein the projecting part comprises a plurality of projecting parts provided along a longitudinal direction of the retaining member.

6. The linear actuator according to claim 5, wherein the projecting parts are arranged mutually at equal intervals along the longitudinal direction.

7. A linear actuator in which a slide table is made to move reciprocally along an axial direction of a cylinder main body, comprising:

a guide mechanism comprising a guide block attached to the cylinder main body, the guide block including circulation grooves formed therein, wherein a plurality of rolling bodies roll and circulate through the circulation grooves, and cover members disposed on ends of the guide block, the guide mechanism being configured to guide the slide table along an axial direction of the cylinder main body;

a retaining member mounted on the guide block and configured to retain the rolling bodies so as to be freely circulatable in the circulation grooves, and retain the cover members with respect to the guide block, the retaining member including a rolling body retaining section extending along the circulation grooves and configured to retain the rolling bodies, and cover retaining sections which are bent with respect to the rolling body retaining section, wherein the retaining member is disposed detachably with respect to the guide block, and wherein the cover retaining sections extend along an outer side surface of the cover members and are disposed in abutment with the outer side surface of the cover members to retain the cover members, wherein the cover retaining sections are formed with a V-shape section defining a convex shape toward the cover members, and are engaged with engagement sections of the cover members, the engagement sections define a concave portion that complements the convex shape of the cover retaining sections.

* * * * *